United States Patent
Shimizu

(10) Patent No.: US 10,145,498 B2
(45) Date of Patent: Dec. 4, 2018

(54) FLANGE JOINING STRUCTURE AND SEAL BODY USED THEREIN

(71) Applicant: Kyowa Industry Co., Ltd., Higashiohmi-shi, Shiga (JP)

(72) Inventor: Katsuya Shimizu, Higashiohmi (JP)

(73) Assignee: KYOWA INDUSTRY CO., LTD., Shiga (JP)

(*) Notice: Subject to any disclaimer, the term of this patent is extended or adjusted under 35 U.S.C. 154(b) by 370 days.

(21) Appl. No.: 14/893,715

(22) PCT Filed: Apr. 11, 2014

(86) PCT No.: PCT/JP2014/060538
§ 371 (c)(1),
(2) Date: Nov. 24, 2015

(87) PCT Pub. No.: WO2014/192442
PCT Pub. Date: Dec. 4, 2014

(65) Prior Publication Data
US 2016/0102793 A1  Apr. 14, 2016

(30) Foreign Application Priority Data
May 31, 2013 (JP) .................................. 2013-115055

(51) Int. Cl.
*F16L 23/18* (2006.01)
*F16L 23/02* (2006.01)
(Continued)

(52) U.S. Cl.
CPC ............. *F16L 23/18* (2013.01); *F16J 15/122* (2013.01); *F16L 23/02* (2013.01); *F16L 23/24* (2013.01)

(58) Field of Classification Search
CPC .. F16L 23/18; F16L 23/02; F16L 23/24; F16J 15/122
(Continued)

(56) References Cited

U.S. PATENT DOCUMENTS 4,756,561 A * 7/1988 Kawata ................... F16L 23/18
277/627 X
4,836,562 A   6/1989 Yoshimo
(Continued)

FOREIGN PATENT DOCUMENTS

DE   102006010430 A1   9/2007
JP   S51025650 A       3/1976
(Continued)

OTHER PUBLICATIONS

KIPO Notification of Reason for Refusal for corresponding KR Patent Application No. 10-2015-7036622; dated Aug. 16, 2017.
(Continued)

*Primary Examiner* — Greg Binda
*Assistant Examiner* — Zachary T Dragicevich
(74) *Attorney, Agent, or Firm* — Cantor Colburn LLP

(57) ABSTRACT

Provided is a flange joining structure having excellent earthquake resistance, for which the joining operation can be performed simply and easily, similar to conventional practice. A flange joining structure provided with a first member having a first annular flange part, a second member having a second annular flange part, and a seal body placed between the first member and the second member, these components being connected and joined together by a bolt and a nut. The seal body has an annular base part formed from a metal plate and an elastic seal part provided integrally to the annular base part, the elastic seal part being provided so as to cover the annular base part, and the elastic seal part of the seal (Continued)

body sealing the space between the first annular flange part and the second annular flange part.

13 Claims, 16 Drawing Sheets

(51) Int. Cl.
*F16L 23/24* (2006.01)
*F16J 15/12* (2006.01)

(58) Field of Classification Search
USPC .......................... 285/368, 412; 277/595, 627
See application file for complete search history.

(56) References Cited

U.S. PATENT DOCUMENTS

| | | | | |
|---|---|---|---|---|
| 6,869,081 | B1* | 3/2005 | Jenco | F16L 23/18 285/368 X |
| 2006/0145429 | A1* | 7/2006 | Casler | F16J 15/122 277/627 |
| 2010/0013220 | A1* | 1/2010 | Rao | F16L 23/18 285/368 |
| 2011/0140374 | A1* | 6/2011 | Dubiel | F16L 23/18 |
| 2013/0328270 | A1* | 12/2013 | Stubblefield | F16J 15/122 |
| 2015/0260317 | A1* | 9/2015 | Yamamoto | F16J 15/122 |

FOREIGN PATENT DOCUMENTS

| | | |
|---|---|---|
| JP | S51085155 U | 7/1976 |
| JP | 58077970 A | 5/1983 |
| JP | S6362693 U | 4/1988 |
| JP | H07332557 A | 12/1995 |
| JP | H09292071 A | 11/1997 |
| JP | H10122373 A | 5/1998 |
| JP | 2004052817 A | 2/2004 |
| JP | 3152172 U | 7/2009 |
| JP | 2009236219 A | 10/2009 |
| KR | 920010898 B1 | 12/1992 |
| KR | 200322580 Y1 | 8/2003 |
| WO | 2012046713 A1 | 4/2012 |

OTHER PUBLICATIONS

Notification of Transmittal of Translation of the International Preliminary Report on Patentability corresponding to Application No. PCT/JP2014/060538; dated Dec. 3, 2015.
Partial English translation of JPS51-025650A dated Aug. 26, 1974.
Partial English translation of JPS51-085155U dated Dec. 27, 1974.
International Preliminary Report on Patentability corresponding to Application No. PCT/JP2014/060538; dated Sep. 30, 2015.
International Search Report corresponding to Application No. PCT/JP2014/060538; dated Aug. 19, 2014, with English translation.
Written Opinion of the International Preliminary Examining Authority corresponding to Application No. PCT/JP2014/060538; dated Jul. 21, 2015.
JP Notification of Reasons for Refusal corresponding to Application No. 2016-224591; dated Jan. 30, 2018.

* cited by examiner

FLANGE JOINING STRUCTURE AND SEAL BODY USED THEREIN

CROSS REFERENCE TO RELATED APPLICATIONS

This is the U.S. national stage of application No. PCT/JP2014/060538, filed on Apr. 11, 2014. Priority under 35 U.S.C. § 119(a) and 35 U.S.C. § 365(b) is claimed from Japanese Application No. 2013-115055, filed May 31, 2013, the disclosure of which is also incorporated herein by reference.

TECHNICAL FIELD

The present invention relates to a flange joining structure used for connecting between fluid pipes such as a water pipe, a gas pipe, and plant piping, between such a fluid pipe and a device (such as an air valve, a fire plug, or a repair valve, for example) coupled to the pipe, between these devices, or the like, and to a seal body used in the flange joining structure.

BACKGROUND ART

Various flange joining structures used for connection between fluid pipes have been proposed (see, for example, Patent Literatures 1 and 2), and various seal bodies for sealing have also been proposed (see, for example, Patent Literature 3). For example, in the flange joining structure disclosed in Patent Literature 1, a seal body, disposed between a flange portion of a first member (for example, a pipe member) and a flange portion of a second member (for example, a pipe member), includes a hard ring and a ring-shaped packing that is disposed on an inner circumference portion of the hard ring and, the hard ring is thinner than the hard ring. In the flange joining structure, when the first and the second members are joined to each other (fixed to each other through fastening with a bolt, a nut, and the like, for example) with the seal body sandwiched between the flange portions of the first and the second members, the hard ring has one surface in contact with an end surface of the flange portion of the first member and the other surface in contact with an end surface of the flange portion of the second member. Thus, the ring-shaped packing can be prevented from being excessively compressed, and thus compression exceeding an elastic limit can be prevented.

In the flange joining structure disclosed in Patent Literature 2, a seal body, disposed between a flange portion of a first member (for example, a pipe member) and a flange portion of a second member (for example, a pipe member), includes a ring-shaped packing main body and a plurality of compression limiting pieces that are embedded in the packing main body at an interval along a circumference direction. In the flange joining structure, when the first and the second members are joined to each other with the seal body sandwiched between the flange portions of the first and the second members, the plurality of compression limiting pieces limit the movement of the first and the second members toward each other, whereby the ring-shaped packing can be prevented from being excessively compressed.

The seal body disclosed in Patent Literature 3 is disposed between a first member (for example, a cylinder) and a second member (for example, a cylinder head), and includes a sealing annular body formed of an elastic material such as rubber and a ring-shaped reinforcement body that reinforces the sealing annular body. The ring-shaped reinforcement body is integrally provided to the sealing annular body by molding. The seal body has the ring-shaped reinforcement body increasing the rigidity of the sealing annular body, and thus prevents the sealing annular body from deforming (deforming at the time of replacing, deformation due to performance degradation, or the like).

CITATION LIST

Patent Literature

PTL1: Japanese Unexamined Patent Application Publication No. H7-332557
PTL2: Japanese Unexamined Patent Application Publication No. H9-292071
PTL3: Japanese Unexamined Utility Model Application Publication No. S51-85155

SUMMARY OF INVENTION

Technical Problem

The flange joining structure is applied to a piping structure illustrated in FIG. 26 for example. In the piping structure illustrated in FIG. 26, a T shaped pipe 102, defining a T shaped flow path, includes three connection pipe portions 104, 106, and 108. The connection pipe portion 104 is connected to a pipe member 110 extending toward an upstream side for example. The connection pipe portion 106 is connected to a pipe member 114 extending toward a downstream side for example. The connection pipe portion 108 is connected to an air valve 118 via a repair valve 116 for example. The flange joining structure described above is applied to these connections. For example, the connection pipe portion 104 of the T shaped pipe 102 is connected to the pipe member 110 as follows. More specifically, a joining bolt is inserted through a through hole of a flange portion 120, a seal body 124, and a flange portion 122 with the seal body 124 disposed between the flange portions 120 and 122 of the connection pipe portion 104 and the pipe member 110. Then, a nut is screwed onto a male screw portion of a bolt protruding beyond the through hole, whereby the flange portion 120 of the T shaped pipe 102 and the flange portion 122 of the pipe member 110 are joined to each other with the seal body 124 disposed in between.

However, in the flange joining structures in Patent Literatures 1 and 2, the through holes through which the joining bolt is inserted are formed in a packing (packing main body) providing a sealing function. Thus, when large bending stress is applied to the flange joining structure by an earthquake or the like, the packing (packing main body) might move with respect to the bolt, to be damaged. When the packing (packing main body) is damaged, a sealing performance (airtightness) might be degraded. The problem regarding the sealing performance is likely to occur in a joining structure between the connection pipe portion 108 of the T shaped pipe 102 and the repair valve 116, and in a joining structure between the repair valve 116 and the air valve 118.

When the seal body disclosed in Patent Literature 3 is used in the flange joining structure, the sealing annular body (that functions as the packing) is not fixed, and is likely to move and deform upon receiving the large bending stress due to an earthquake, and might even be damaged when the movement and deformation are large, and thus the same problem occurs.

An object of the present invention is to provide a highly earthquake proof flange joining structure with which a joining operation can be simply and easily performed as in the conventional case.

Another object of the present invention is to provide a highly earthquake proof seal body.

Solution to Problem

A flange joining structure according to the present invention includes a first member including a first annular flange portion, a second member including a second annular flange portion, and a seal body disposed between the first annular flange portion of the first member and the second annular flange portion of the second member. A bolt is inserted through a through hole in each of the first annular flange portion, the second annular flange portion, and the seal body. A nut is screwed onto a male screw portion of the bolt so that the first annular flange portion and the second annular flange portion are joined to each other. The seal body includes: an annular base portion formed of a metallic plate, and an elastic sealing unit integrally formed on the annular base portion. A plurality of the through holes are provided on the annular base portion at an interval along a circumference direction. The elastic sealing unit is provided to cover the annular base portion. The elastic sealing unit of the seal body provides sealing between the first annular flange portion of the first member and the second annular flange portion of the second member.

In the flange joining structure according to the present invention, the elastic sealing unit of the seal body may be integrally provided to cover an area extending from one surface of an inner circumference portion of the annular base portion to another side via the inner circumference surface.

In the flange joining structure according to the present invention, a first protrusion that comes into contact with the first annular flange portion of the first member may be provided on one surface side of the annular base portion of the seal body, and a second protrusion that comes into contact with the second annular flange portion of the second member may be provided on another surface side.

In the flange joining structure according to the present invention, a plurality of the first protrusions of the seal body may be provided on the one surface side of the annular base portion at an interval along the circumference direction, and a plurality of the second protrusions of the seal body may be provided on the other surface side of the annular base portion at an interval along the circumference direction.

In the flange joining structure according to the present invention, the annular base portion may be formed of first and second metallic plates, the first protrusions of the annular base portion may be formed by bending a plurality of portions of the first metallic plate in the circumference direction, the second protrusions of the annular base portion may be formed by bending a plurality of portions of the second metallic plate in the circumference direction, and the annular base portion may be formed by stacking the first metallic plate and the second metallic plate with the first protrusions on the one surface side of the seal body and the second protrusions on the other surface side of the seal body.

In the flange joining structure according to the present invention, roughening to form a rough surface and/or drilling for forming a through hole may be performed on the inner circumference portion of the annular base portion of the seal body.

A seal body according to the present invention is disposed between a first annular flange portion of a first member and a second annular flange portion of a second member. The seal body includes an annular base portion formed of a metallic plate, and an elastic sealing unit integrally provided to the annular base portion. A plurality of through holes through which bolts are inserted are provided on the annular base portion at an interval along a circumference direction. The elastic sealing unit is provided to cover the annular base portion. The elastic sealing unit provides sealing between the first annular flange portion of the first member and the second annular flange portion of the second member.

Advantageous Effects of Invention

In the flange joining structure according to the present invention, the seal body, disposed between the first annular flange portion of the first member and the second annular flange portion of the second member includes: an annular base portion formed of a metallic plate; and an elastic sealing unit integrally formed on the annular base portion, and a plurality of the through holes are provided on the annular base portion. Thus, the annular base portion can be surely held between the first and the second annular flange portions with a bolt and a nut, whereby the movement of the elastic sealing unit can be prevented, and a damage caused by the movement can be prevented. The elastic sealing unit is integrally provided to the annular base portion, whereby the elastic sealing unit can be prevented from moving and being damaged.

In the flange joining structure according to the present invention, the elastic sealing unit of the seal body is integrally provided to cover an area extending from one surface of an inner circumference portion of the annular base portion to another side via the inner circumference surface. Thus, a large contact area between the elastic sealing unit and the annular base portion can be achieved, whereby the elastic sealing unit can be more rigidly integrated to the annular base portion.

In the flange joining structure according to the present invention, a first protrusion that comes into contact with the first annular flange portion of the first member is provided on one surface side of the annular base portion of the seal body, and a second protrusion that comes into contact with the second annular flange portion of the second member is provided on another surface side. Thus, the first protrusion comes into contact with the first annular flange portion of the first member, whereby the elastic sealing unit can be prevented from excessively deforming on the one surface side of the seal body. Furthermore, the second protrusion comes into contact with the second flange portion of the second member, whereby the elastic sealing unit can be prevented from excessively deforming on the other surface side of the seal body.

In the flange joining structure according to the present invention, a plurality of the first protrusions of the seal body are provided on the one surface side of the annular base portion in an annular form, and a plurality of the second protrusions of the seal body are provided on the other surface side of the annular base portion in an annular form. Thus, the first protrusion can stably act on the first annular flange portion of the first member to prevent the elastic sealing unit from excessively deforming on the one surface side of the seal body. The second protrusion can stablely act on the second annular flange portion of the second member to prevent the elastic sealing unit from excessively deforming on the other surface side of the seal body.

In the flange joining structure according to the present invention, a plurality of the first protrusions of the seal body are provided on the one surface side of the annular base portion at an interval along the circumference direction, and a plurality of the second protrusions of the seal body are provided on the other surface side of the annular base portion at an interval along the circumference direction. Also with this configuration, the plurality of first protrusions can stably act on the first annular flange of the first member to prevent the elastic sealing unit from excessively deforming on the one surface side of the seal body. The plurality of second protrusions can act on the second annular flange of the second member to prevent the elastic sealing unit from excessively deforming on the other surface side of the seal body.

In the flange joining structure according to the present invention, the first protrusions of the annular base portion are formed by bending a plurality of portions of the first metallic plate in the circumference direction, the second protrusions of the annular protrusion are formed by bending a plurality of portions of the second metallic plate in the circumference direction. Thus, the first protrusion and the second protrusion can be easily manufactured by pressing for example. The annular base portion is formed by stacking with which the first protrusions are provided on the one surface side of the seal body and the second protrusions are provided on the other surface side of the seal body, and thus can be easily manufactured.

In the flange joining structure according to the present invention, roughening to form a rough surface and/or drilling for forming a through hole is performed on the inner circumference portion of the annular base portion of the seal body. Thus, a large contact area between the elastic sealing unit and the annular base portion can be achieved, whereby the elastic sealing unit can be more rigidly integrated to the annular base portion.

The seal body according to the present invention has the basic structure that is the same as that of the seal body in the flange joining structure according to the present invention, the annular base portion can be surely fixed between the first and the second annular flange portions with a bolt and a nut, whereby the elastic sealing unit can be prevented from moving and from being damaged by the movement. Furthermore, the elastic sealing unit can be integrally provided to the annular base portion.

DESCRIPTION OF EMBODIMENTS

Various embodiments of a flange joining structure and a seal body used in the same according to the present invention are described below with reference to the attached drawings.

Figure 1:
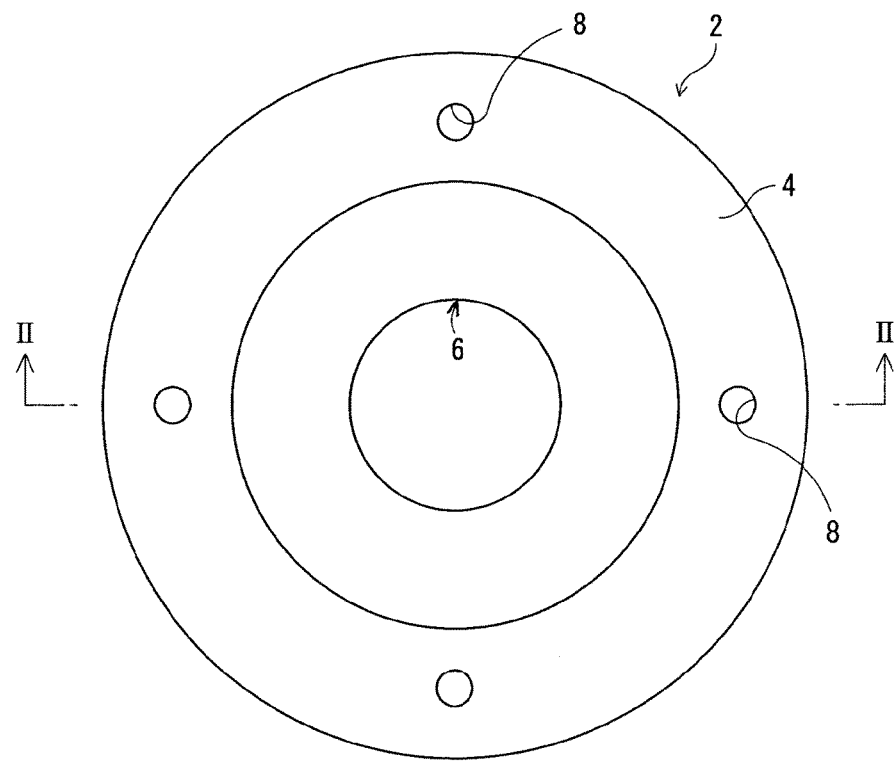
FIG. 1 is a front view illustrating a seal body of a first mode used in a flange joining structure according to the present invention.
Figure 2:
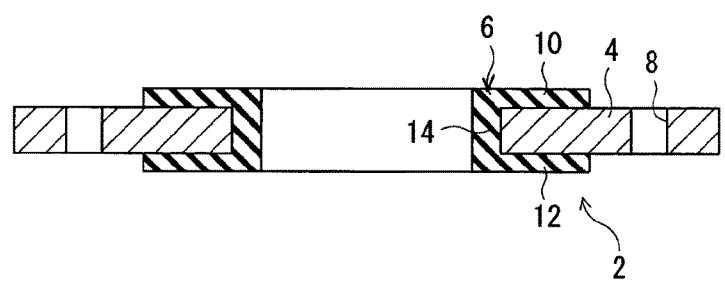
FIG. 2 is a cross-sectional view taken along a line II-II in FIG. 1.

First of all, a seal body of a first mode used in the flange joining structure is described with reference to FIGS. 1 and 2. An illustrated seal body 2 includes an annular base portion 4 and an annular elastic sealing unit 6 integrally provided to an inner circumference portion of the annular base portion 4. The annular base portion 4 is formed of a metallic plate such as stainless steel for example. In the annular base portion 4, a plurality of (four in this mode) through holes 8 are formed at a substantially equal interval along a circumference direction. The inner circumference portion of the annular base portion 4 is an inner circumference surface proximate portion in the inner circumference surface of the annular base portion 4 and a surface adjacent to the inner circumference surface (upper and lower surfaces in FIG. 2).

The elastic sealing unit 6 is formed of synthetic rubber and the like for example, and is provided to cover the inner circumference portion of the annular base portion 4. As illustrated in FIG. 2, an outer circumference portion of the elastic sealing unit 6 protrudes radially outer. A first sealing unit 10 on one side covers one surface (upper surface in FIG. 2) of the inner circumference portion of the annular base portion 4 and a second sealing unit 12 on the other side covers the other surface (lower surface in FIG. 2) of the inner circumference portion of the annular base portion 4. A connecting section 14, connecting between the first and the second sealing units 10 and 12, covers the inner circumference surface of the annular protrusion 4.

Figure 4:
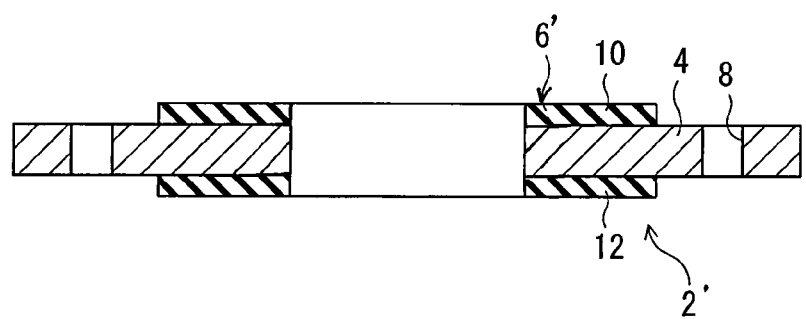
FIG. 4 is a cross-sectional view illustrating a seal body of a second mode.

The elastic sealing unit may be provided as illustrated in FIG. 4. An elastic sealing unit 6' of a seal body 2' illustrated in FIG. 4 includes no connecting section covering the inner circumference surface of the annular base portion 4. The first sealing unit 10 of the elastic sealing unit 6' at least partially covers the one surface (upper surface in FIG. 4) of the inner circumference portion of the annular base portion 4. The second sealing unit 12 at least partially covers the other surface (lower surface in FIG. 4) of the inner circumference portion of the annular base portion 4. The advantageous effects that are substantially the same as those obtained by the seal body 2 illustrated in FIGS. 1 and 2 can also be obtained with the seal body 2'.

The seal body 2 can be formed as follows. The annular base portion 4 is set in a fixed mold (not illustrated), clamping is performed with a movable mold (not illustrated) moved with respect to the fixed mold, and then synthetic rubber for example is injected into a molding space defined by the fixed mold and the movable mold. Through this vulcanized molding, the elastic sealing unit 6 illustrated in the figure can be integrally formed on the inner circumference portion of the annular base portion 4.

Figure 3:
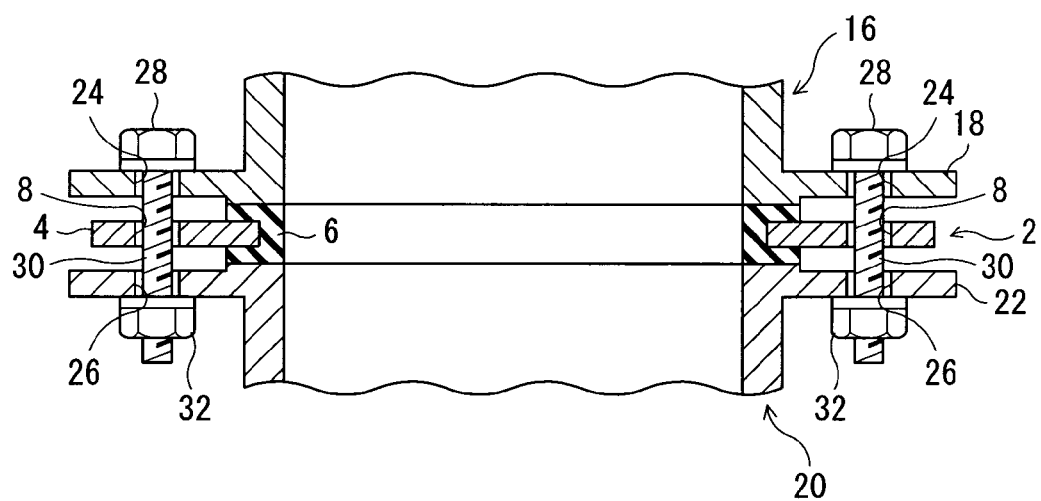
FIG. 3 is a cross-sectional view illustrating the flange joining structure according to a first embodiment using the seal body illustrated in FIG. 1.

As illustrated in FIG. 3, the seal body 2 is installed between a first annular flange portion 18 of a first member 16 and a second annular flange portion 22 of a second member 20. A plurality of (four in this mode) of through holes 24, corresponding to the plurality of through holes 8 formed in the annular base portion 4 of the seal body 2, are provided to the first annular flange portion 18 of the first member 16. A plurality of (four in this mode) of through holes 26, corresponding to the plurality of through holes 8 of the seal body 2, are also provided to the second annular flange portion 22 of the second member 20.

For example, the joined connection between the first member 16 and the second member 20 is achieved as follows. The seal body 2 is disposed between the first annular flange portion 18 of the first member 16 and the second annular flange portion 22 of the second member 20. In this state, a male screw portion 30 of a joining bolt 28 is inserted through the through hole 24 of the first annular flange portion 18, the through hole 8 of the annular base portion 4 of the seal body 2, and the through hole 26 of the second annular flange portion 22. Then, a nut 32 is screwed onto and fastened to the male screw portion 30 of the bolt 28 protruding from the second annular flange portion 22. Thus, the desired joined connection between the first member 16 and the second member 20 can be achieved. A higher earthquake-proof effect can be achieved by using a lock nut (product name: hardlock nut) manufactured and sold by HARDLOCK INDUSTRY CO., LTD., for example as the nut 32.

In the joined state, the elastic sealing unit 6 of the seal body 2 is disposed in a compressed state between an end surface (what is known as a gasket seat) of the first annular flange portion 18 of the first member 16 and an end surface (what is known as a gasket seat) of the second annular flange portion 22 of the second member 20. Thus, the elasticity of the elastic sealing unit 6 ensures the sealing between the first annular flange portion 18 and the second annular flange portion 22. The male screw portion 30 of the joining bolt 28 extends through the through hole 8 of the annular base portion 4 of the seal body 2. Thus, the movement of the annular base portion 4 is inhibited by the male screw portion 30, whereby relative movement of the seal body 2 with respect to the elastic sealing unit 6 can be prevented. Thus, even when the first and the second members 16 and 20 are relatively shifted from each other by a certain amount by an earthquake and the like, the elastic sealing unit 6 of the seal body 2 is prevented from moving. As a result, the elastic sealing unit 6 can be prevented from being damaged, and the sealing performance provided by the elastic sealing unit 6 can be maintained.

The first member 16 and the second member 20 are a fluid pipe such as a water pipe, a gas pipe, and plant piping as a pipe member, and are a device connected to the fluid pipe such as an air valve, a fire plug, and a repair valve. The seal body 2 can be used in the flange joining structure for achieving the joined connection between the members as described above.

Next, a seal body of a third mode will be described with reference to FIG. 5. In the third mode, the configuration described below is employed to make the elastic sealing unit 6 more rigidly integrated. The configurations in the following mode that are substantially the same as that in the modes described above are denoted with the same reference numerals, and the description thereof will be omitted.

Figure 5:
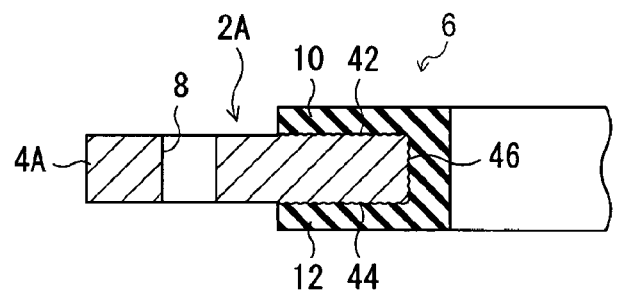
FIG. 5 is a cross-sectional view illustrating a part of a seal body of a third mode.

This seal body 2A illustrated in FIG. 5 has a surface partially provided with rough surface areas 42, 44, and 46 including minute recesses and protrusions, with roughening performed on an inner circumference portion of an annular base portion 4A. In this mode, the rough surface area 42 is provided to one surface of the inner circumference portion of the annular base portion 4 to which the first sealing unit 10 of the elastic sealing unit 6 is provided. The rough surface area 44 is provided to the other surface of the inner circumference portion of the annular base portion 4 to which the second sealing unit 12 of the elastic sealing unit 6 is provided. The rough surface area 46 is provided to the inner circumference surface of the annular base portion 4. The rough surface areas 42, 44, and 46 can be formed through roughening such as shot blasting and sand blasting. The other configurations of the third mode are the same as the counterparts in the first mode described above.

With the rough surface areas 42, 44, and 46, a large contact area between the annular base portion 4A and the elastic sealing unit 6 can be achieved, whereby the annular base portion 4A and the elastic sealing unit 6 can be more rigidly integrated with each other.

The rough surface areas 42, 44, and 46 may not necessarily to be provided to all of the one, the other, and the inner circumference surfaces of the inner circumference portion of the annular base portion 4A as in this mode. The advantageous effect that is the same as that described above can also be obtained by providing the three areas to any one or two of the areas.

Next, a seal body according to a fourth mode is described with reference to FIGS. 6 and 7. In the fourth mode, the following improvement is made so that an elastic sealing unit 6B is more rigidly integrated.

Figure 6:
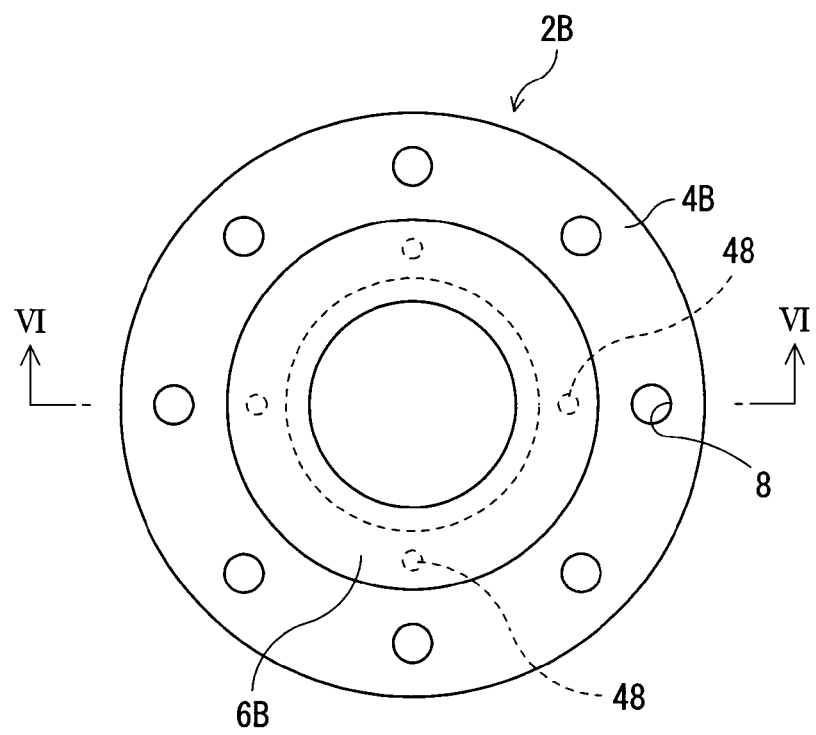
FIG. 6 is a front view illustrating a seal body of a fourth mode.
Figure 7:
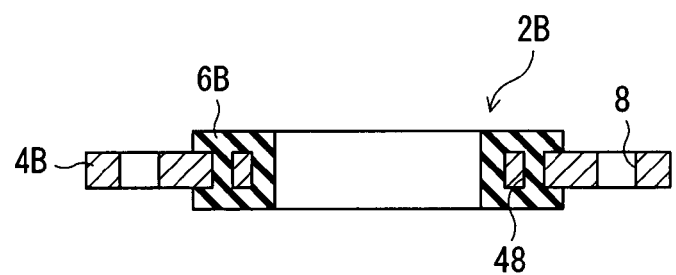
FIG. 7 is a cross-sectional view taken along a line VI-VI in FIG. 6.

The seal body 2B of the fourth mode illustrated in FIGS. 6 and 7 includes a plurality of (four in this mode) communication holes 48 arranged at an interval on an inner circumference portion of an annular base portion 4B. The communication holes 48 are formed from one surface to the other surface of the annular base portion 4B. The communication holes 48 can be formed by drilling. The number of communication holes 48 may be set as appropriate, and may six or eight for example.

When the communication holes 48 are formed as described above, the synthetic rubber partially flows into the communication holes 48, while the vulcanized molding of the elastic sealing unit 6B is in process, to be integrated with the annular base portion 4B. Thus, the annular base portion 4B and the elastic sealing unit 6B can be more rigidly integrated with each other. The rough surface areas (the areas denoted with 42, 44, and 46 in FIG. 5) may be provided to the inner circumference portion of the annular base portion 4B on which the communication holes 48 are formed, so that the annular base portion 4B and the elastic sealing unit 6B can be even more rigidly integrated with each other.

In the fourth mode, the eight through holes 8 are arranged at an interval along a circumference direction of the annular base portion 4B. For example, the seal body 2B including the eight through holes 8 can be used for achieving the joined connection between the first and the second members having the first and the second annular flange portions each including eight through holes, and between the first and the second members having the first and the second annular flange portions each including four through holes. The through holes 8 thus formed in various ways (for four-points fastening, six-points fastening, eight-points fastening, or the like for example) can be used for achieving the fastened connection between the first and the second members of various types, whereby the seal body 2B can be more commonly used.

Next, a second embodiment of a flange joining structure including a seal body of a fifth mode is described with reference to FIG. 8. In the second embodiment, an annular base portion 4C of a seal body 2C has a protrusion for preventing an elastic sealing unit 6C from excessively deforming.

Figure 8:
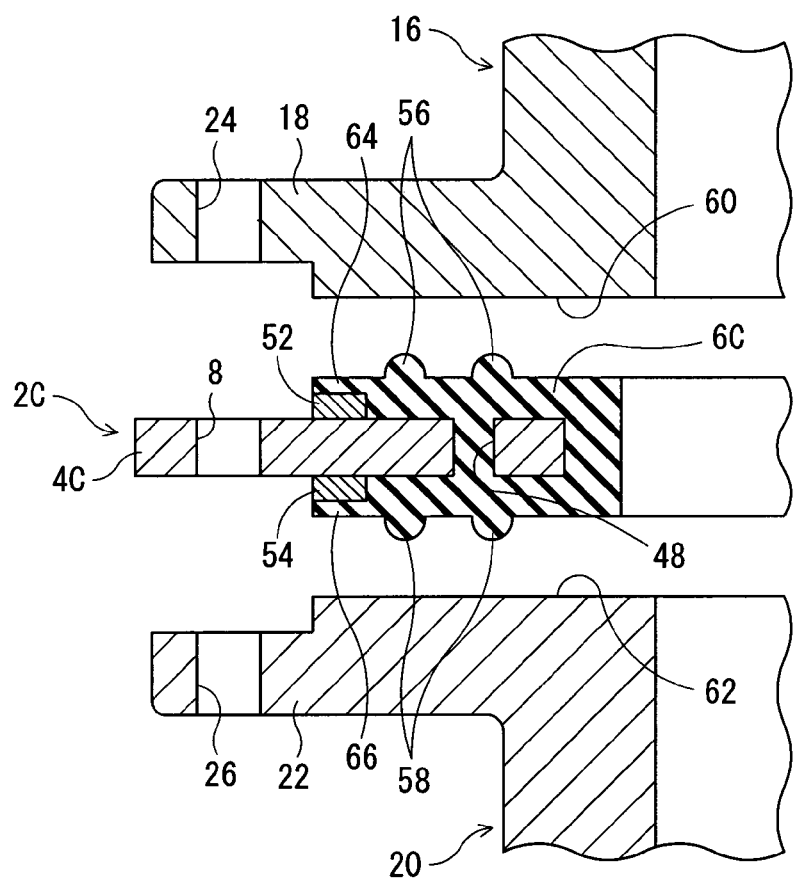
FIG. 8 is an exploded view illustrating a flange joining structure according to a second embodiment employing a seal body of a fifth mode, in an exploded state.

In FIG. 8, the seal body 2C of the fifth mode includes the annular base portion 4C and the elastic sealing unit 6C provided to the inner circumference portion of the annular base portion 4C. The annular base portion 4C includes the plurality of (four for example) through holes 8 provided at an interval along the circumference direction. The plurality of (four for example) communication holes 48 may be provided on the inner circumference portion (where the elastic sealing unit 6C is provided) at an interval along the circumference direction. The communication holes 48 and the configuration related thereto are substantially the same as that in the fourth mode illustrated in FIGS. 6 and 7. With the communication holes 48, the advantageous effect that the elastic sealing unit 6C is more rigidly integrated with the annular base portion 4C can be obtained as described above.

In this mode, a first ring-shaped member 52 is provided at a portion of one surface side of the annular base portion 4C more on a radially outer side than a portion where the communication hole 48 is provided. The first ring-shaped member 52 functions as a first protrusion that prevents the elastic sealing unit 6C from excessively deforming on the one surface side of the annular base portion 4C as described later. A second ring-shaped member 54 is provided at a portion of the other side of the annular base portion 4C more on a radially outer side than the portion where the communication hole 48 is provided. The second ring-shaped member 54 functions as a second protrusion that prevents the elastic sealing unit 6C from excessively deforming on the other side of the annular base portion 4C as described later. The first and the second ring-shaped members 52 and 54 may be formed of a hard material such as stainless steel, hard plastic, and the like for example.

In this mode, as illustrated in FIG. 8, the elastic sealing unit 6C is provided to cover the first and the second ring-shaped members 52 and 54 (more specifically, the inner circumference surface and the upper surface thereof). A pair of first annular sealing protrusions 56 are formed on one surface (upper surface in FIG. 8) of the elastic sealing unit 6C while being apart from each other in the radial direction. A pair of second annular sealing protrusions 58 are formed on the other surface (lower surface in FIG. 8) while being apart from each other in the radial direction. Alternatively, three or more first annular sealing protrusion 56 and three or more second annular sealing protrusions 58 may be provided to achieve higher sealing performance. The other configurations of the flange joining structure of the second embodiment are the same as the counterparts in the first embodiment described above.

In the flange joining structure of the second embodiment, the seal body 2C is manufactured as follows. The first ring-shaped member 52 (first protrusion) is fixed on a predetermined position of the one surface of the annular base portion 4C through fixing adhesion with adhesive, welding, or the like. The second ring-shaped member 54 (second protrusion) is fixed on a predetermined position of the other surface through fixing adhesion with adhesive, welding, or the like. The annular base portion 4C (having the first and the second ring-shaped members 52 and 54 fixed thereon) is set in a fixed mold (not illustrated), clamping is performed with a movable mold (not illustrated) moved with respect to the fixed mold, and then synthetic rubber for example is injected into a molding space defined by the fixed mold and the movable mold. Through this vulcanized molding, the elastic sealing unit 6C as illustrated in the figure can be integrally formed on the inner circumference portion of the annular base portion 4C.

Through the vulcanized molding, the annular base portion 4C and the elastic sealing unit 6C can be rigidly integrated with each other with the synthetic rubber partially flowing into the communication holes 48 of the annular base portion 4C during the molding, as in the fourth mode. The first and the second ring-shaped members 52 and 54 are covered with the synthetic rubber. Thus, the first and the second ring-shaped members 52 and 54 do not come into direct contact with the end surfaces (i.e., the gasket seats 60 and 62) of the first and the second annular flange portions 18 and 22 of the first and the second members 16 and 20 when fixed connection is achieved as described later.

The joined connection between the first member 16 and the second member 20 is achieved in a manner that is the same as that described above. As can be seen in FIG. 8, in the joined connection state, the first ring-shaped member 52 is in contact with the end surface (gasket seat 60) of the first annular flange portion 18 via a synthetic rubber layer 64. Thus, a constant elastic deformation amount of the elastic sealing unit 6C is achieved and excessive elastic deformation is prevented, on the one surface side of the annular base portion 4C. The second ring-shaped member 54 is in contact with the end surface (gasket seat 62) of the second annular flange portion 22 via a synthetic rubber layer 66. Thus, a constant elastic deformation amount of the elastic sealing unit 6C is achieved and excessive elastic deformation is prevented, also on the other surface side of the annular base portion 4C.

In this joined connection state, elasticity of the pair of first annular sealing protrusions 56 acts on the end surface (the gasket surface 60) of the first annular flange portion 18 on the one surface side of the seal body 2C. Thus, the sealing between the first annular flange portion 18 and the seal body 6C can be ensured. Furthermore, elasticity of the pair of second annular sealing protrusions 58 acts on the end surface (the gasket surface 62) of the second annular flange portion 22 on the other surface side of the seal body 2C. Thus, the sealing between the second annular flange portion 22 and the seal body 6C can be ensured.

When the fasting is performed between the joining bolt and the nut (that are not illustrated) with the seal body 6C disposed between the first annular flange portion 18 and the second annular flange portion 22, conventionally, non-uniform crushing of the seal body 6C over the portions due to insufficient fastening (for example, non-uniform clamping over a plurality of fastening portions), has resulted in the inclined end surface (gasket surface 60) of the first annular flange portion 18 and/or the inclined end surface (gasket surface 62) of the second annular flange portion 22 causing water stop failure. To address this, the first and the second ring-shaped members 52 and 54 are provided. More specifically, the fastening is performed until the gasket surfaces 60 and 62 of the first and the second members 18 and 22 come into contact with the first and the second ring-shaped members 52 and 54 via the synthetic rubber layers 64 and 66. Thus, the plurality of fastening portions can have a uniform size without the need for a special torque managing at the time of fastening. All things considered, the fastening can be extremely easily prevented from being insufficient at the time of manufacturing, and an attempt to improve the manufacturing operability can be facilitated.

The first and the second protrusions need not to be formed in the ring shape from the first and the second ring-shaped members 52 and 54 as in this mode, and may be formed as a plurality of short column members or arc-shaped members that are disposed at an interval along the circumference direction, and adjacent to the through holes 8 where the fastening force is applied in particular.

Figure 9:
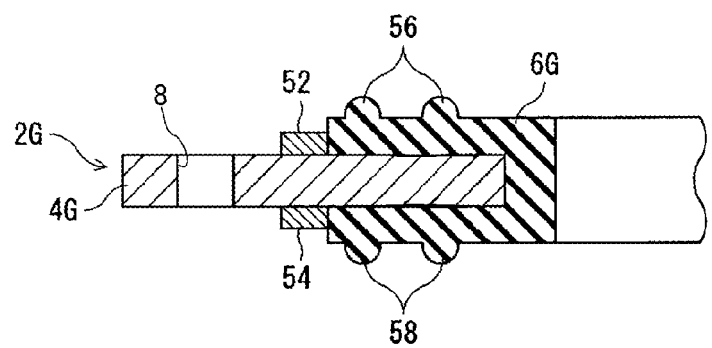
FIG. 9 is a cross-sectional view illustrating a part of the seal body of the fifth mode.

FIG. 9 illustrates a seal body of a sixth mode. The basic configuration of a seal body 2G of the sixth mode illustrated in FIG. 9 is substantially the same as that in the fifth mode illustrated in FIG. 8. The first ring-shaped member 52 is provided to the one surface of the annular base portion 4G, the second ring-shaped member 54 is provided to the other surface thereof. The first ring-shaped member 52 functions as the first protrusion that maintains the constant elastic deformation amount on the one surface side of the elastic sealing unit 6G. The second ring-shaped member 54 functions as the second protrusion that maintains the constant elastic deformation amount on the other surface side of the elastic sealing unit 6G. The first and the second ring-shaped member 52 and 54 can be attached to the annular base portion 4G in a manner that is the same as that in the fifth mode described above.

In this mode, an upper surface of the first ring-shaped member 52 is exposed to the outside. The one surface side of the elastic sealing unit 6G protrudes beyond the upper surface of the first ring-shaped member 52 toward the one surface side. In the joined connection state, the upper surface of the first ring-shaped member 52 is in direct contact with the end surface (gasket seat 60) of the first flange portion 18. Furthermore, an upper surface of the second ring-shaped member 54 is also exposed to the outside. The other surface side of the elastic sealing unit 6G protrudes beyond the upper surface of the second ring-shaped member 54 toward the other surface side. In the joined connection state, the upper surface of the second ring-shaped member 54 is in direct contact with the end surface (gasket seat 62) of the second flange portion 22 (see FIG. 8 for the first and the second members 16 and 20).

In the seal body 2G of this sixth mode, as in that in the fifth mode, the annular base portion 4G and the elastic sealing unit 6G can be integrally formed with the synthetic rubber flowing in in the vulcanized molding as described above. In the sixth mode, the communication holes of the annular base portion 4G are omitted. Thus, the elastic sealing unit 6G is integrally provided to an area covering the one, the inner circumference, and the other surfaces of the inner circumference portion of the annular base portion 4G.

When the seal body 2G of the sixth mode is used, because the basic configuration is substantially the same as that in the fourth mode, the same advantageous effect as that in the case where the fourth mode is employed can be obtained. Because the pair of first annular sealing protrusions 56 and the pair of second annular sealing protrusions 58 are supported by the annular base portion 4G, the sealing between the first and the second flange portions 18 and 22 can be stably ensured, as in the fourth mode.

Figure 10:
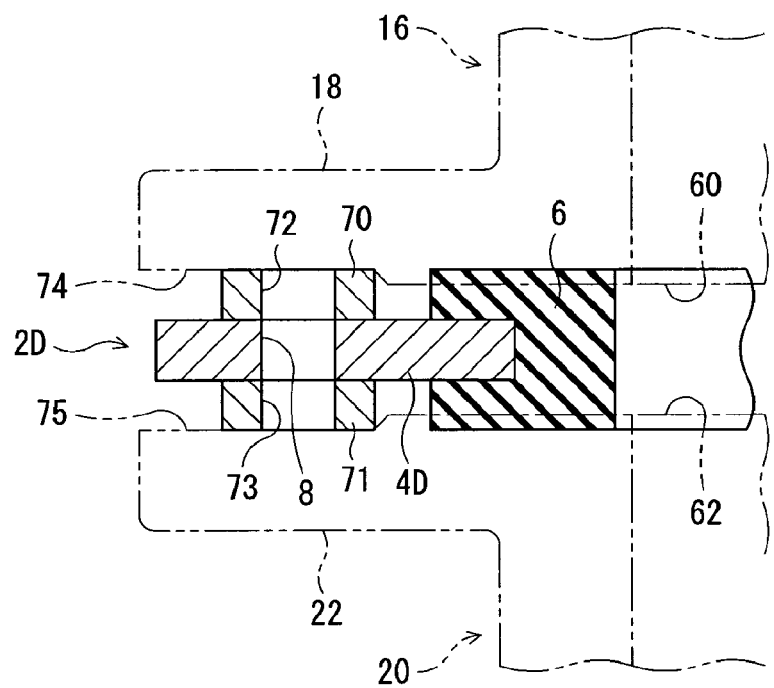
FIG. 10 is a cross-sectional view illustrating a part of a seal body of a sixth mode.

FIG. 10 illustrates a seal body of a seventh mode. In the seventh mode, a seal body obtained by modifying the annular base portion in the first mode is used. In the seal body 2D illustrated in FIG. 10, washer members 70 and 71 are provided that have a predetermined thickness and correspond to the through holes 8 provided to the annular base portion 4D. The washer members 70 and 71 are provided to have insertion holes 72 and 73 thereof aligned with the through holes 8 of the annular base portion 4D, and are fixed to the annular base portion 4D through fixing adhesion with adhesive, welding, or the like. The washer members 70 and 71 need not to be fixed as described above. Alternatively, joining bolts (not illustrated) may be inserted through the insertion holes 72 and 73 of the washer members 70 and 71 and the through holes 8 of the annular base portion 4D, so that the one washer member 70 is provided to the one surface side of the annular base portion 4D and the other washer member 71 is provided to the other surface side thereof.

In the seal body 2D, as illustrated in FIG. 10, the elastic sealing unit 6 has a one side portion protruding beyond the washer member 70 toward the one surface side, and the other side portion protruding beyond the other washer member 71 toward the other surface side. In a state where the first annular flange portion 18 of the first member 16 and the second flange portion 22 of the second member 20 are fastened to each other with the elastic sealing unit 6 of the seal body 2D disposed in between, the elastic sealing unit 6 is disposed between the end surface (gasket seat 60) of the first annular flange portion 18 and the end surface (gasket seat 62) of the second annular flange portion 22 to provide the sealing therebetween.

The washer member 70 comes into contact with a recessed step portion 74 of the first annular flange portion 18. Thus, a constant distance between the annular base portion 4D and the end surface (gasket seat 60) of the first annular flange portion 18, in other words, a constant elastic deformation amount of the elastic sealing unit 6 on one surface side of the annular base portion 4D is achieved, whereby the excessive elastic deformation on the one surface side can be prevented. The other washer member 71 comes into contact with a recessed step portion 75 of the second annular flange portion 22. Thus, a constant distance between the annular base portion 4D and the end surface (gasket seat 62) of the second annular flange portion 22, in other words, a constant elastic deformation amount of the elastic sealing unit 6 on the other surface side of the annular base portion 4D is achieved, whereby the excessive elastic deformation on the other surface side can be prevented.

As described above, the one washer member 70 functions as the first protrusion that comes into contact with the first annular flange portion 18 (more specifically, the recessed step portion 74 thereof), and the other washer member 71 functions as the second protrusion that comes into contact with the second annular flange portion 22 (more specifically, the recessed step portion 75 thereof). Also with this configuration, the advantageous effect that is the same as the case where the first and the second ring-shaped members 52 and 54 in the fifth mode illustrated in FIG. 8 are provided can be obtained.

Figure 11:
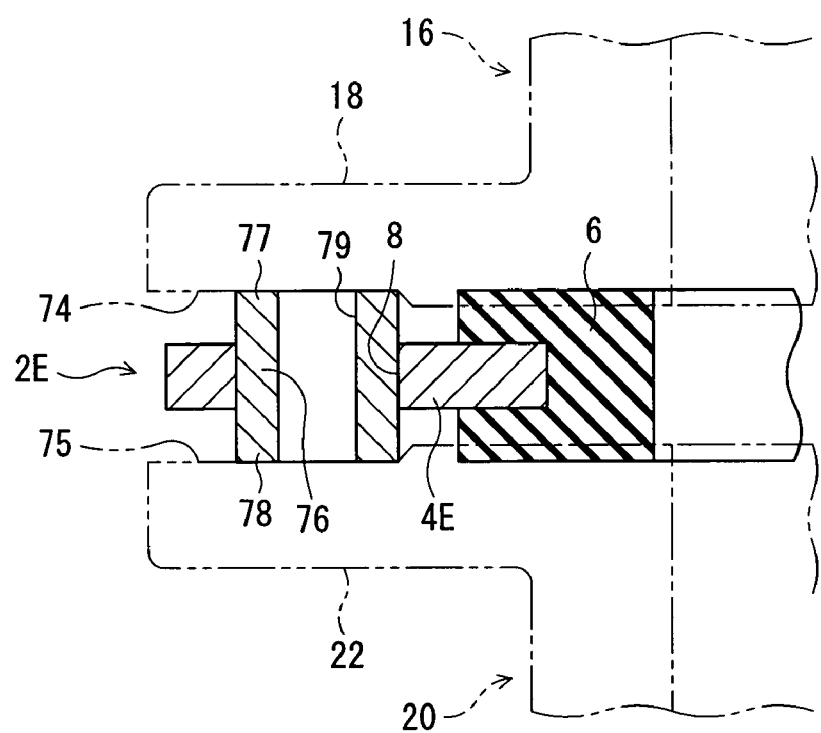
FIG. 11 is a cross-sectional view illustrating a part of a seal body of a seventh mode.

FIG. 11 illustrates a seal body of an eighth mode. In the eighth mode, a short sleeve member 79 is used instead of the washer members 70 and 71 in the seventh mode in FIG. 10. In a seal body 2E illustrated in FIG. 11, the short sleeve member 76 having a desired length is inserted in the through hole 8 of the annular base portion 4E and is fixed to the annular base portion 4E through fixing adhesion with adhesive, welding, or the like.

When the seal body 2E is used, as can be seen in FIG. 11, a joining bolt (not illustrated) is inserted through a sleeve hole 79 for the short sleeve member 76 of the seal body 2E. The short sleeve member 76 has one end portion 77 protruding beyond the annular base portion 4E toward one side (upper side in FIG. 11) and the other end portion 78 protruding beyond the annular base portion 4E toward the other side (lower side in FIG. 11). The coupling connection can be achieved as desired as in the above described case also when this seal body 2E is used.

In this joined connection state, the elastic sealing unit 6 of the seal body 2E is disposed between the end surface (gasket seat 60) of the first annular flange portion 18 and the end surface (gasket seat 62) of the second annular flange portion 22 to provide the sealing therebetween. The one end portion 77 of the short sleeve member 76 comes into contact with the recessed step portion 74 of the first annular flange portion 18, to achieve a constant elastic deformation amount of the elastic sealing unit 6 on the one surface side of the annular base portion 4E. The other end portion 78 of the short sleeve member 76 comes into contact with the recessed step portion 75 of the second annular flange portion 22, to achieve a constant elastic deformation amount of the elastic sealing unit 6 on the other surface side of the annular base portion 4E. All things considered, the advantageous effect that is the same as that in the seventh mode illustrated in FIG. 10 can be achieved.

As described above, in this mode, the one end portion 77 of the short sleeve member 76 functions as the first protrusion that comes into contact with the first annular flange portion 18 (more specifically, the recessed step portion 74 thereof), and the other end portion 78 of the short sleeve member 76 functions as the second protrusion that comes into contact with the second annular flange portion 22 (mode specifically, the recessed step portion 75 thereof).

Next, a seal body of a ninth mode is described with reference to FIGS. 12 and 13. In the ninth mode, deformation processing is executed on an annular base portion 4F of the seal body 2F, whereby the first and the second protrusions are integrally formed.

Figure 12:
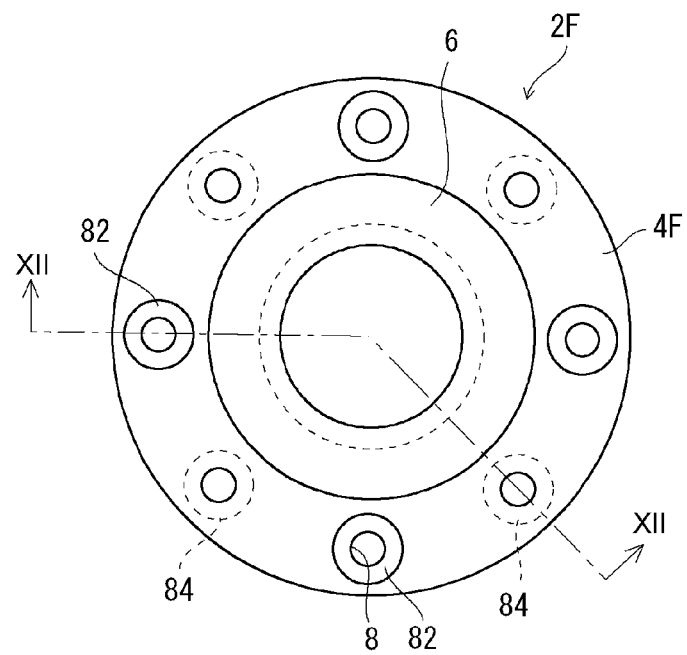
FIG. 12 is a cross-sectional view illustrating a part of a seal body of an eighth mode.
Figure 13:
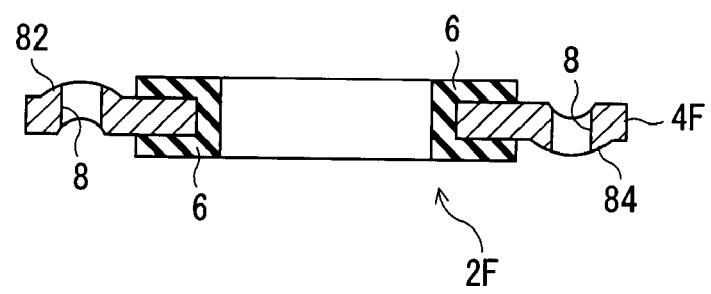
FIG. 13 is a cross-sectional view taken along a line XII-XII in FIG. 12.

In the seal body 2F of the ninth mode illustrated in FIGS. 12 and 13, the plurality of (eight in this mode) through holes 8 are provided on the annular base portion 4F at an interval along the circumference direction. The first protrusions respectively related to four alternating holes of the eight through holes 8 are provided, and the second protrusions related to the four remaining holes of the through holes 8 are provided.

For example, the annular base portion 4F can be manufactured as follows. More specifically, the eight through holes 8 are formed on an annular metallic plate at an interval along the circumference direction. Then, first protruding portions 82 (as the first protrusions) protruding toward one surface side (upper side in FIG. 13) are formed by performing, for example, pressing in a predetermined direction (toward the upper side in FIG. 13) at portions of the alternating holes of the through holes 8. Subsequently, second protruding portions 84 (as the second protrusions) protruding toward the other surface side (lower side in FIG. 12) are formed by performing, for example, pressing in a direction opposite to the predetermined direction (toward the lower side in FIG. 13) at portions of the remaining holes of the through holes 8. Then, the elastic sealing unit 6 is integrally provided to the inner circumference portion of the annular base portion 4F described above, in the manner described above, whereby the seal body 2F illustrated in FIGS. 12 and 13 can be manufactured.

When the seal body 2F is used, in the joined connection state, the first protruding portion 82 of the annular base portion 4F comes into contact with the first flange portion 18 (see FIG. 10 (recessed step portion 74)). Thus, a constant elastic deformation amount is achieved on the one surface side of the elastic sealing unit 6. The second protruding portion 84 thereof comes into contact with the second flange portion 22 (see FIG. 10 (recessed step portion 76)). Thus, a constant elastic deformation amount is achieved on the other surface side of the elastic sealing unit 6. All things considered, the advantageous effect that is the same as that in the seventh mode can be achieved with the seal body 2F described above.

Next, a seal body of a tenth mode is described with reference to FIGS. 14 and 15. In the tenth mode, an annular base portion 4H of a seal body 2H is formed of a pair of metallic plates, and the first and the second protrusions are formed by the deformation processing.

Figure 14:
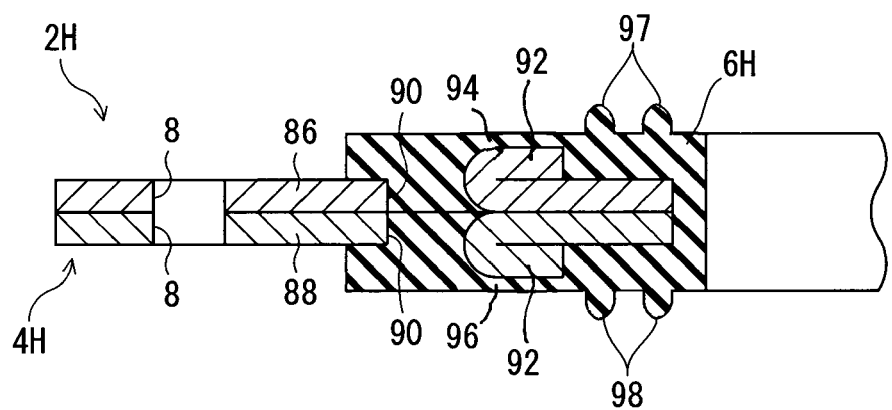
FIG. 14 is a cross-sectional view illustrating a part of a seal body of a ninth mode.
Figure 15:
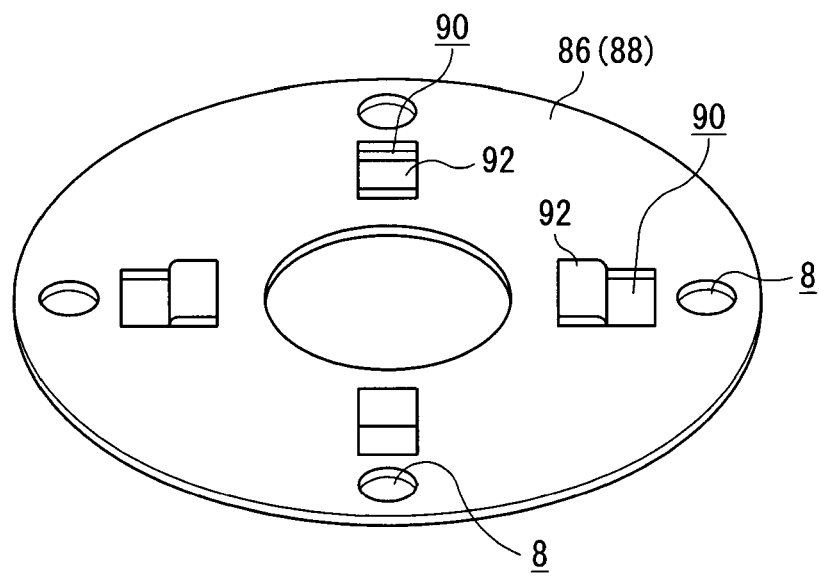
FIG. 15 is a perspective view of a metallic plate in the seal body illustrated in FIG. 14.

In the seal body 2H of the tenth mode illustrated in FIGS. 14 and 15, the annular base portion 4H is formed of a pair of ring-shaped metallic plates, that is, first and second metallic plates 86 and 88. The first and second metallic plates 86 and 88 have substantially the same configuration. The first metallic plate 86 (second metallic plate 88) is described below.

The first metallic plate 86 (second metallic plate 88) is formed of stainless steel for example, and has the plurality of (four in this mode) through holes 8 provided on the outer circumference side thereof at an interval along the circumference direction. Joining bolts (not illustrated) are inserted through the through holes 8. A plurality of (four in this mode) communication holes 90 and protrusions 92 are provided on an inner circumference side of the first metallic plate 86 (second metallic plate 88) at an interval along the circumference direction. The plurality of through holes 8, the plurality of communication holes 90, and the protrusions 92 need not to be aligned in the radial direction as in this mode, and may be provided to form a zigzag pattern in the circumference direction. The numbers of the through holes 8, the communication holes 90, and the protrusions 92 need not to be the same as in this mode. For example, the numbers of the communication hole 90 and the protrusions 92 may be larger than the number of through holes. For example, the communication hole 90 and the protrusions 92 may be provided on both sides of the through holes 8.

For example, the first metallic plate 86 (second metallic plate 88) can be easily manufactured as follows. First of all, the metallic plate 86 (88) having a disk shape has a center portion punched by pressing (first pressing) to be in a ring shape. The through holes 8 can be formed by punching out a circular shape while the first pressing is in process (or in second pressing after the first pressing), and at the same time, a tongue piece (a portion to be the protrusion 92) is formed by punching out a rectangular U shape. Then, the tongue piece is bent toward the inner side in the diameter direction for example, through plastic deformation by pressing, whereby the protrusions 92 are formed.

In the first metallic plate 86 (second metallic plate 88) formed as described above, the protrusion 92, obtained by bending the tongue piece, functions as the first protrusion (second protrusion) and an opening obtained by bending the tongue piece functions as the communication hole 90, as can be seen in FIGS. 14 and 15.

The seal body 2H is manufactured as follows. The first and the second metallic plates 86 and 88 are stacked as desired so that the protrusions 92 are positioned on both sides, and fixing or temporary connecting is performed through fixing adhesion with adhesive, welding, and the like for example as appropriate. In the stacked state, as illustrated in FIG. 14, the protrusion 92 of the first metallic plate 86 is positioned on one surface side of the seal body 2H to function as the first protrusion. The protrusion 92 of the second metallic plate 88 is positioned on the other surface side of the seal body 2H to function as the second protrusion. The through holes 8 as well as the communication holes 90 of the first and the second metallic plates 86 and 88 are aligned with each other.

The annular base portion 4H (the first and the second metallic plates 86 and 88) is set in a fixed mold (not illustrated), clamping is performed with a movable mold (not illustrated) moved with respect to the fixed mold, and then synthetic rubber for example is injected into a molding space defined by the fixed mold and the movable mold. Through this vulcanized molding, the elastic sealing unit 6H illustrated in the figure can be integrally formed at the inner circumference portion of the annular base portion 4H.

Through the vulcanized molding, the annular base portion 4H and the elastic sealing unit 6H can be rigidly integrated with each other with the synthetic rubber partially flowing into the communication holes 90 of the annular base portion 4H in the molding, as in the fourth mode. The upper surfaces of the protrusions 92 of the first and the second metallic plates 86 and 88 are covered with the synthetic rubber. Thus, the protrusions 92 (first and second protrusions) do not come into direct contact with the end surfaces (see FIG. 10 (i.e., the gasket seats 60 and 62)) of the first and the second annular flange portions 18 and 22 of the first and the second members 16 and 20, when the fixed connection is achieved.

As can be seen in FIG. 14, in a joined connection state using the seal body 2H, the protrusion 92 (first protrusion) of the first metallic plate 86 is in contact with the end surface (see FIG. 10 (gasket seat 60)) of the first annular flange portion 18 of the first member 16 via a synthetic rubber layer 94. Thus, the excessive elastic deformation of the elastic sealing unit 6H can be prevented on the one surface side of the annular base portion 4H. The protrusion 92 of the second metallic plate 88 is in contact with the end surface (see FIG. 10 (gasket seat 62)) of the second annular flange portion 22 of the second member 20 via a synthetic rubber layer 96. Thus, the excessive elastic deformation of the elastic sealing unit 6H can be prevented on the other surface side of the annular base portion 4H. A first annular sealing protrusion 97 that provides sealing with respect to the end surface (see FIG. 10 (gasket surface 60)) of the first annular flange portion 18 is provided on the one surface side of the elastic sealing unit 6H. A second annular sealing portion 98 that provides sealing with respect to the end surface (see FIG. 10 (gasket surface 62)) of the second annular flange portion 22 is provided on the other surface side of the elastic sealing unit 6H. Thus, the sealing can be ensured between the seal body 6H and the first and the second annular flange portion 18 and 22 (see FIG. 10) of the first and the second members 16 and 20 as in the case described above. Furthermore, the protrusions 92 are formed on the first and the second metallic plates 86 and 88 by deformation processing (bending), and thus can be easily formed without requiring an additional member.

A seal body of an eleventh mode is described with reference to FIGS. 16 and 17. In this seal body 2K illustrated in FIG. 16, an annular base portion 4K of the seal body 2K is formed from a pair of ring-shaped metallic plates, that is, a first metallic plate 130 and a second metallic plate 132, and protrusions (the first and the second protrusions 134 and 136) are formed by partially bending the first and the second metallic plates 130 and 132, as in the case of the seal body 2H of the tenth mode. In the seal body 2K illustrated in FIG. 17, the plurality of (four in this mode) through holes 8 are provided on the annular base portion 4K at an interval along the circumference direction. The first protrusions 134 respectively related to the two alternating holes of the four through holes 8, and the second protrusions 136 respectively related to the remaining two holes of the through holes 8 are provided.

For example, the annular base portion 4K can be manufactured as follows. More specifically, the four through holes 8 are formed on the annular first metallic plate 130 at an interval along the circumference direction. Tongue pieces (to be bent to be the first protrusion 134) and the communication holes 90 are alternately formed along the circumference direction, on the radially inner side of the through holes 8.

Similarly, the four through holes 8 are formed on the annular second metallic plate 132 at an interval along the circumference direction. Tongue pieces (to be bent to be the second protrusion 136) and the communication holes 90 are alternately formed along the circumference direction, on the radially inner side of the through holes 8.

The tongue piece of the first metallic plate 130 and the communication hole 90 of the second metallic plate 132 and the communication hole 90 of the first metallic plate 130 and the tongue piece of the second metallic plate 132 are disposed to be overlapped one another. Pressing is performed in such a manner that the tongue piece of the first metallic plate 130 is bent toward the communication hole 90 of the second metallic plate 132 to clamp the second metallic plate 132. Processing is performed in such a manner that the tongue piece of the second metallic plate 132 is bent toward the communication hole 90 of the first metallic plate 130 to clamp the first metallic plate 130. Thus, the first metallic plate 130 and the second metallic plate 132 are integrally formed with the tongue piece of the first metallic plate 130 wrapped around the second metallic plate 132 and the tongue piece of the second metallic plate 132 wrapped around the first metallic plate 130.

Figure 16A:
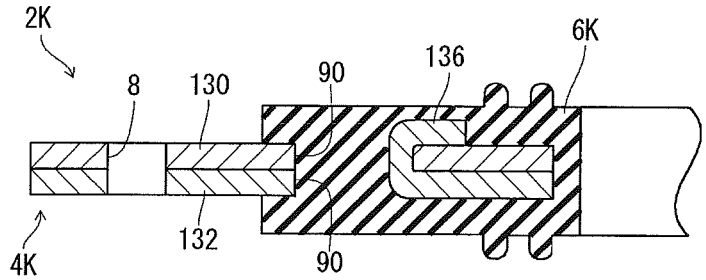
FIG. 16A is a cross-sectional view of a seal body in which one of metallic plates forming an annular base portion is bent.
Figure 16B:
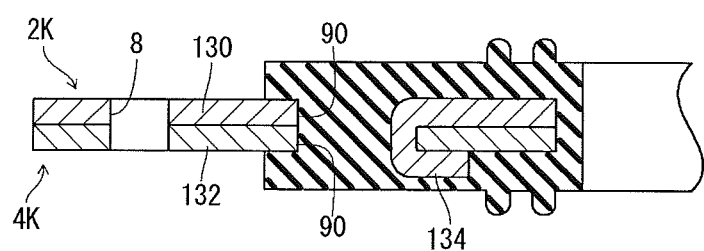
FIG. 16B is a cross-sectional view of the seal body in which the other one of the metallic plates forming the annular base portion is bent.
Figure 17:
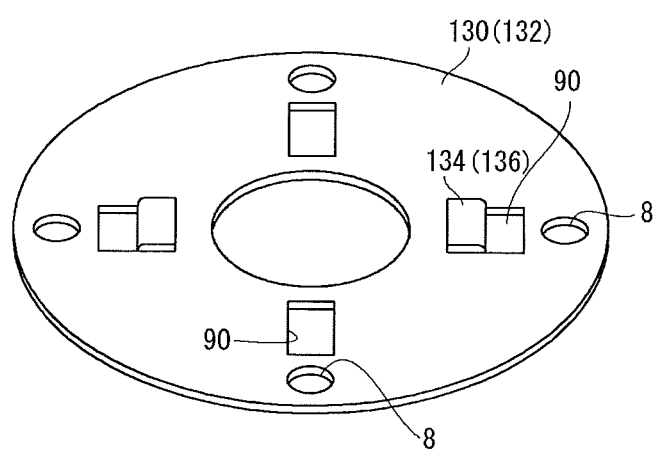
FIG. 17 is a perspective view of a metallic plate in the seal body illustrated in FIG. 16.

As can be seen in FIGS. 16 and 17, in the first metallic plate 130 (second metallic plate 132) thus formed, the tongue piece is bent to function as the first protrusion 134 (second protrusion 136), and an opening formed by bending the tongue piece toward the first metallic plate 130 (second metallic plate 132) functions as the communication hole 90.

The seal body 2K is manufactured as follows. The annular base portion 4K (the first metallic plate 130 and the second metallic plate 132) is set in a fixed mold (not illustrated), clamping is performed with a movable mold (not illustrated) moved with respect to the fixed mold, and then synthetic rubber for example is injected into a molding space. Through this vulcanized molding, the elastic sealing unit 6K illustrated in the figure can be integrally formed on the inner circumference portion of the annular base portion 4K.

As described above, the first metallic plate 130 and the second metallic plate 132 need not to be temporarily connected in advance for manufacturing the seal body 2K, whereby a lower manufacturing cost can be achieved.

Other embodiments of a metallic plate (forming the annular base portion) are described with reference to FIGS. 18 to 20. In this modification, an annular base portion 4J of a seal body is formed from a single metallic plate, and the first and the second protrusions are formed by deformation processing as in the tenth embodiment.

Figure 18:
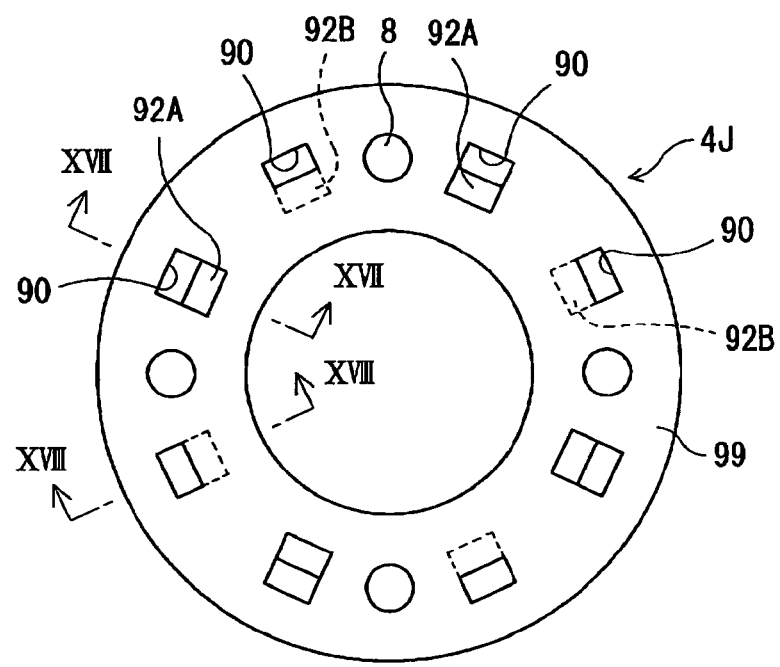
FIG. 18 is a front view illustrating another mode of a metallic plate.
Figure 19:
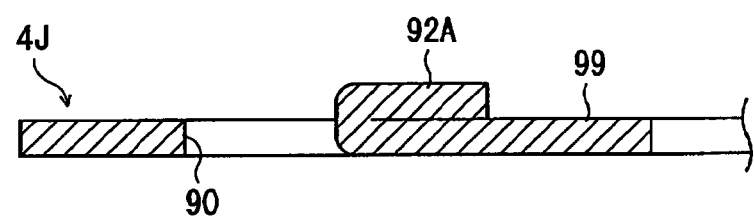
FIG. 19 is a cross-sectional view taken along a line XVII-XVII in FIG. 18.
Figure 20:
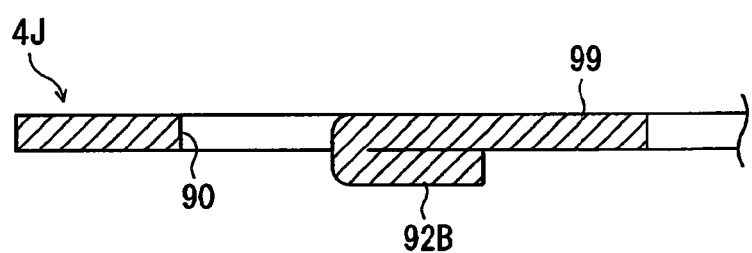
FIG. 20 is a cross-sectional view taken along a line XVIII-XVIII in FIG. 18.

In FIGS. 18 to 20, the annular base portion 4J of the seal body is formed from a single metallic plate, that is, a metallic plate 99. The metallic plate 99 is formed of stainless steel as in the tenth mode, and has the plurality of (four in this mode) through holes 8 at an outer circumference portion thereof at an interval along the circumference direction. Joining bolts (not illustrated) are inserted through the through holes 8. In this mode, the communication holes 90 and protrusions 92A and 92B are formed on both sides of each of the plurality of through holes 8. The protrusion 92A on the downstream side of the through hole 8 in a clockwise direction in FIG. 18 is bent toward the one surface side of the metallic plate 99 (annular base portion 4J) to function as the first protrusion as illustrated in FIG. 19. The protrusions 92B on the upstream side of the through hole 8 in the clockwise direction is bent toward the other surface side of the metallic plate 99 (annular base portion 4J) to function as the second protrusion as illustrated in FIG. 20.

The communication holes 90 as well as the protrusions (the first and the second protrusions 92A and 92B) need not to be provided on both sides of each of the through holes 8 as in this mode. The plurality of through holes 8, the plurality of communication holes 90, and the protrusions (the first and the second protrusions 92A and 92B) may be provided to form a zigzag pattern in the circumference direction. Alternatively, the plurality of communication holes 90 and the protrusions (the first and the second protrusions 92A and 92B) may be provided to match the plurality of through holes 8 in the radial direction (here, the number of the communication holes 90 is the same as the number of the through holes 8, but the number of the first protrusions 92 and the number of the second protrusions 92B are half the number of the through holes 8 because the first and the second protrusions 92A and 92B are alternately arranged).

For example, the metallic plate 99 can be manufactured easily as follows as in the case of the tenth mode. First of all, the metallic plate 89 having a disk shape has a center portion punched by pressing (first pressing) to be in a ring shape. The through holes 8 can be formed by punching out a circular shape while the first pressing is in process (or in second pressing after the first pressing), and at the same time, a tongue pieces (a portion to be the protrusions 92A and 92B) are formed by punching out a rectangular U shape. Then, the tongue pieces are plastically deformed as desired, whereby the protrusions (first protrusions 92A and 92B) are formed.

More specifically, the tongue piece on the downstream side of the through hole 8 in the clockwise direction in FIG. 18 is bent toward the radially inner side toward the one surface side of the metallic plate 99 (annular base portion 4J) so that the first protrusion 92A is formed as illustrated in FIG. 19. The communication hole 90, corresponding to the first protrusion 92A, is formed by the bending. The tongue piece on the upstream side of the through hole 8 in the clockwise direction is bent toward the radially inner side toward the other surface side of the metallic plate 99 (annular base portion 4J) so that the second protrusion 92B is formed as illustrated in FIG. 20. The communication hole 90, corresponding to the second protrusion 92B, is formed by the bending.

The annular base portion 4J formed of the metallic plate 99 is used in the vulcanized molding in the substantially same manner as that in the tenth mode, whereby an elastic sealing unit (not illustrated) is integrally formed on the inner circumference portion of the annular base portion 4J so that the seal body is formed.

In the above described mode, a plurality of portions of the metallic plate 99 are punched to form the tongue piece, and the protrusions (first protrusions 92A and the second protrusions 92B) are formed by bending the tongue pieces as desired. However, the shape is not limited to this. For example, a tongue piece including a plurality of tongue sections may be formed by punching out other shapes such as an E shape or a shape with recesses and protrusions. Then, the plurality of tongue sections of the tongue piece may be bent toward any of the one and the other sides of the metallic plate 99 (annular base portion 4J) or both so that the protrusions (the first and the second protrusions 92A and 92B) are formed.

In the embodiment described above, the tongue pieces of the metallic plate 99 are bent toward the radially inner side to form the protrusions (the first and the second protrusions 92A and 92B). However, this should not be construed in a limiting sense, and the protrusions (the first and the second protrusions 92A and 92B) may be formed by bending the tongue pieces toward the radially outer side or laterally in the circumference direction.

Figure 21:
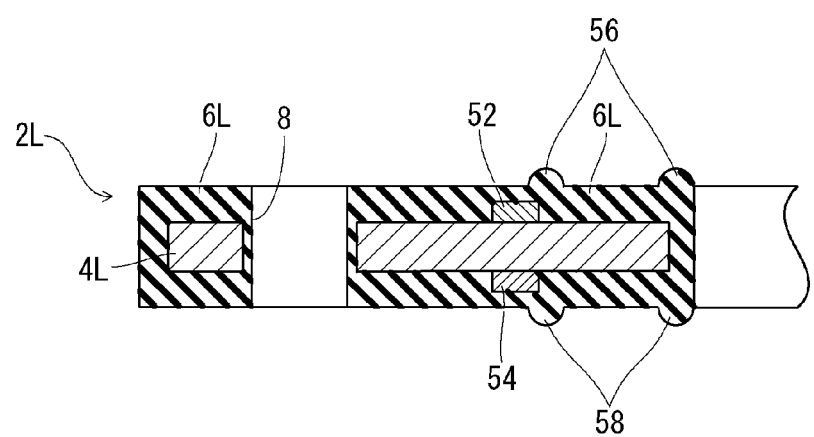
FIG. 21 is a cross-sectional view illustrating a part of a seal body of a twelfth mode.
Figure 22:
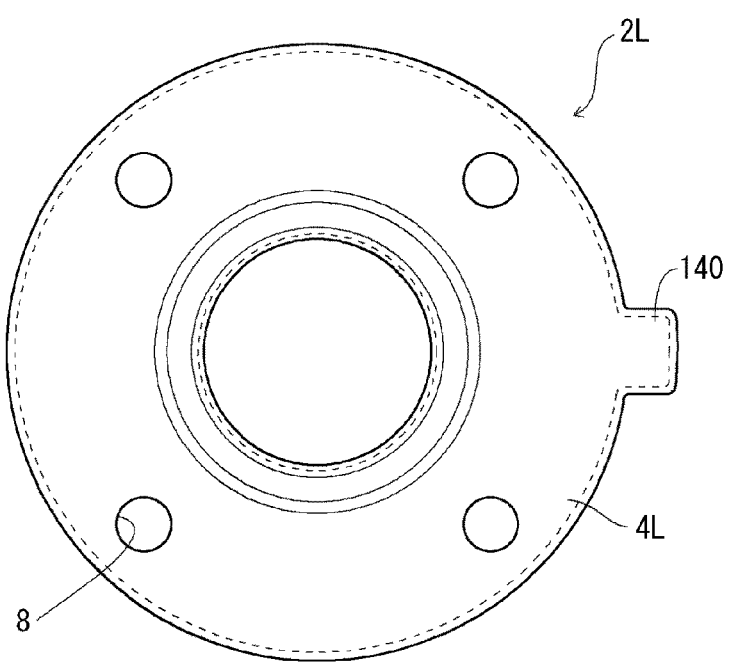
FIG. 22 is a front view of the seal body illustrated in FIG. 21.
Figure 23:
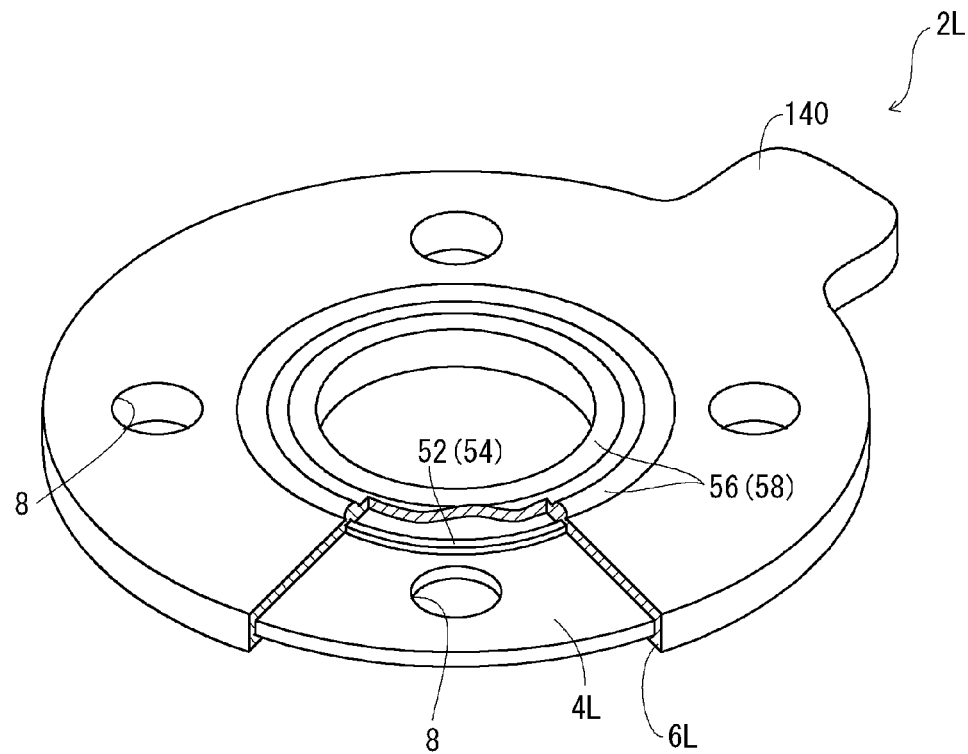
FIG. 23 is a partial cross-sectional view illustrating the inside of the seal body illustrated in FIG. 21.

FIGS. 21 to 23 illustrate a seal body of a twelfth mode. An annular base portion 4L of this seal body 2L of the twelfth mode illustrated in FIG. 21 is formed of a single ring-shaped metallic plate. As illustrated in FIGS. 22 and 23, the annular base portion 4L of the seal body 2L is entirely covered with synthetic rubber.

In FIG. 21, the seal body 2L of the twelfth mode includes the annular base portion 4L, an elastic sealing unit 6L provided to cover the entire annular base portion 4L, the first ring-shaped member 52 provided on one surface of the annular base portion 4L, and the second ring-shaped member 54 provided on the other surface of the annular base portion 4L. The plurality of (four for example) through holes 8 are provided on the annular base portion 4L at an interval along the circumference direction.

As in the case of the seal body 2G of the sixth mode, the first ring-shaped member 52 functions as the first protrusion that prevents the elastic sealing unit 6L from excessively deforming on the one surface side of the annular base portion 4L. The second ring-shaped member 54 functions as the second protrusion that prevents the elastic sealing unit 6L from excessively deforming on the other surface side of the annular base portion 4L.

In this mode, the elastic sealing unit 6L are provided to entirely cover the first ring-shaped member 52, the second ring-shaped member 54, and the annular base portion 4L as illustrated in FIG. 21. The pair of first annular sealing protrusions 56 are provided on one surface (upper surface in FIG. 21) of the elastic sealing unit 6L at an interval in the radial direction. The pair of second annular sealing protrusions 58 are provided on the other surface (lower surface in FIG. 21) of the elastic sealing unit 6L at an interval in the radial direction.

When the first and the second annular sealing protrusions 56 and 58 are provided, in the joined connection state of the first member 16 and the second member 20, the first and the second annular sealing protrusions 56 and 58 come into contact with the end surface (see FIG. 10 (gasket seat 60)) of the first annular flange portion 18 of the first member 16 or the end surface (see FIG. 10 (gasket seat 62)) of the second annular flange portion 22 of the second member 20. Thus, high pressure is applied to the first and the second annular sealing protrusions 56 and 58. Accordingly, the first annular sealing protrusion 56 comes into closer contact with the end surface (see FIG. 10 (gasket seat 60)) of the first annular flange portion 18 of the first member 16, and the second annular sealing protrusion 58 comes into closer contact with the end surface (see FIG. 10 (gasket seat 62)) of the second annular flange portion 22 of the second member 20. Furthermore, the first and the second annular sealing protrusions 56 and 58 are largely deformed to offset the assembly error of the seal body 2L, whereby high sealing performance and water pressure resistance can be achieved.

The same effect can be achieved also in the seal body (embodiments illustrated in FIGS. 8, 9, 14, and 16 for example) provided with the first and the second annular sealing protrusions.

The seal body 2L is manufactured as follows. The first ring-shaped member 52 (first protrusion) and the second ring-shaped member 54 (second protrusion) are respectively fixed to predetermined positions on one and the other surfaces of the annular base portion 4L through the fixing adhesion with adhesive, welding, or the like. The annular base portion 4L (to which the first ring-shaped member 52 and the second ring-shaped member 54 are fixed) is set in a fixed mold (not illustrated), clamping is performed with a movable mold (not illustrated) moved with respect to the fixed mold, and then synthetic rubber for example is injected into a molding space. Through this vulcanized molding, the elastic sealing unit 6L illustrated in the figure can be integrally formed on the inner circumference portion of the annular base portion 4L.

The seal body 2L is waterproofed and insulated with the elastic sealing unit 6L entirely covering the first ring-shaped member 52, the second ring-shaped member 54, and the annular base portion 4L. Thus, the annular base portion 4L can be prevented from corroding due to rust and electrolytic corrosion attributable to current flowing in the ground. Thus, iron cheaper than stainless steel can be used as a material for forming the annular base portion 4L to achieve cost reduction.

When the stainless steel is used as the material for forming the annular base portion 4L, there is no risk of rusting even when the elastic sealing unit 6L is damaged, whereby higher durability can be achieved.

Figure 26:
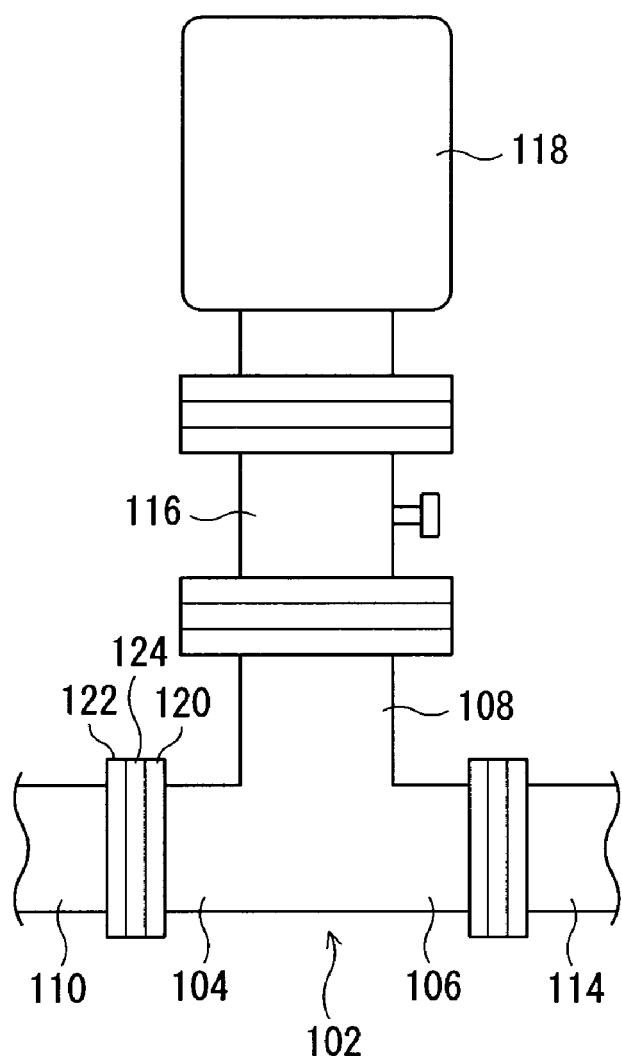
FIG. 26 is s simplified view illustrating an example of a piping structure to which a conventional flange joining structure is applied.

As illustrated in FIGS. 22 and 23, with a flange 140 provided to the seal body 2L, for example, the joining bolt 28 and the through hole 8 can be finely adjusted by using the flange 140 when the seal body 2L is disposed between laterally installed pipes, that is, as illustrated in FIG. 26, between a pipe member 110 and a connection pipe member 104, between a connection pipe member 106 and a pipe member 114, between a pipe member 110 and an unillustrated upstream side pipe member, between the pipe member 114 and an unillustrated downstream pipe member, or the like. Thus, the installability of the seal body 2L can be improved.

Figure 24:
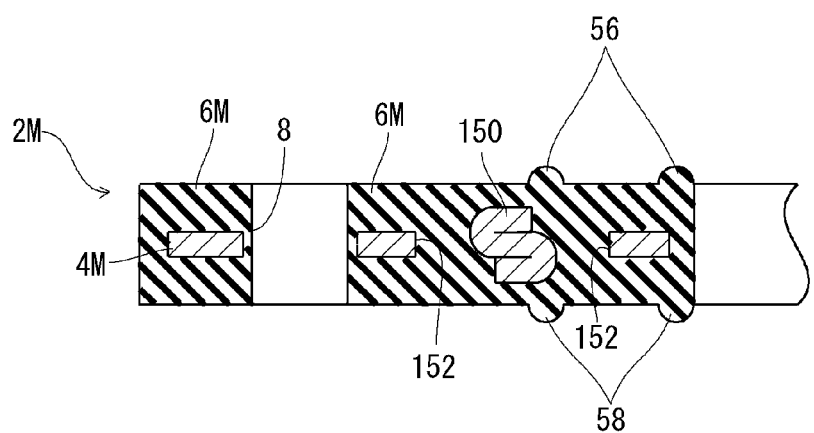
FIG. 24 is a cross-sectional view illustrating a part of a seal body of a thirteenth mode.
Figure 25A:
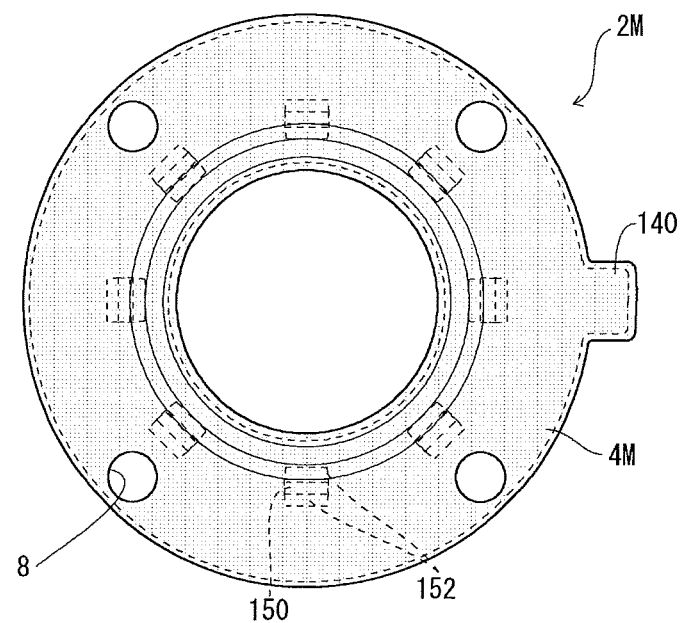
FIG. 25A is a front view of the seal body illustrated in FIG. 24.

FIGS. 24 and 25 illustrate a seal body of a thirteenth mode. An annular base portion 4M of this seal body 2M of the thirteenth mode illustrated in FIG. 24 is formed of a single ring-shaped metallic plate. A protrusion 150 is formed by bending the metallic plate. As illustrated in FIG. 25A, the annular base portion 4M is entirely covered with synthetic rubber.

The seal body 2M of the thirteenth mode illustrated in FIG. 25A includes the annular base portion 4M and an elastic sealing unit 6M provided to cover the entire annular base portion 4M. The plurality of (four in this mode) through holes 8 are provided on the annular base portion 4M at an interval along the circumference direction. The plurality of (eight in this mode) protrusions 150 are provided at an interval along the circumference direction.

Figure 25B:
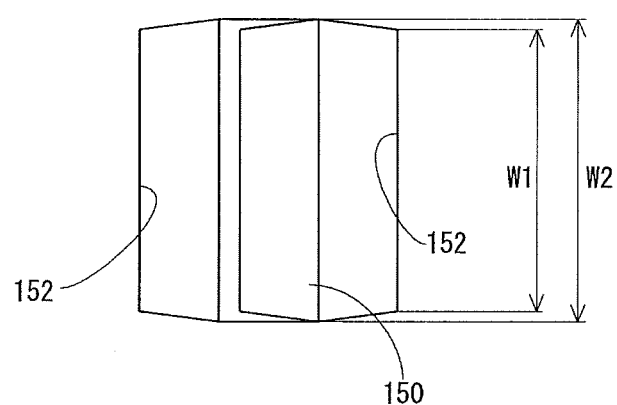
FIG. 25B is an enlarged front view of a protrusion of the seal body.

The annular base portion 4M can be manufactured as follows. More specifically, the four through holes 8 are formed at an interval along the circumference direction of the annular base portion 4M. The tongue pieces (to be bent to be the protrusions 150) are formed by punching out, in the annular base portion 4M, the rectangular U shape in radially inner and outer directions from portions where the protrusions 150 are formed at an interval along the circumference direction that are more on the radially inner side than the through holes 8. As illustrated in FIG. 25B, the tongue piece has a substantially trapezoidal shape with a width W1 of a distal end portion smaller than a width W2 of a base end portion. The pressing can be facilitated by forming the tapered tongue piece in a substantially trapezoidal shape. The tongue pieces are plastically deformed in opposite directions with the tongue piece, formed on the radially inner side by the pressing, plastically deformed toward the radially outer side, and the tongue piece, formed on the radially outer side by the pressing, plastically deformed toward the radially inner side, to be formed as the protrusions 150.

With the protrusion 150 provided to the annular base portion 4M, the communication holes 152 are provided on radially inner and outer sides of the protrusion 150. Thus, the synthetic rubber, for vulcanized molding of the elastic sealing unit 6M, partially flows into the communication holes 152 to be integrated with the annular base portion 4M. Thus, the annular base portion 4M and the elastic sealing unit 6M can be rigidly integrated with each other.

As illustrated in FIG. 25A, with the flange 140 provided to the seal body 2M, for example, the joining bolt 28 and the through hole 8 can be finely adjusted by using the flange 140 when the seal body 2M is disposed between laterally installed pipes as illustrated in FIG. 26, that is, between the pipe member 110 and the connection pipe member 104, between the connection pipe member 106 and the pipe member 114, between the pipe member 110 and an unillustrated upstream side pipe member, between the pipe member 114 and an unillustrated downstream pipe member, or the like. Thus, the installability of the seal body 2M can be improved.

In the embodiments described above, the pressing can be facilitated by employing punching with which a tapered tongue piece is obtained as illustrated in FIG. 25B when punching out a rectangular U shape in the annular base portion. In the embodiment illustrated in FIG. 25B, the tongue piece has a substantially trapezoidal shape. Burr and the like, generated by drilling and punching on the annular base portion, might damage the elastic sealing unit, and thus processing such as chamfering for removing the burrs and the like is preferably executed.

The present invention is not limited to the various embodiments of the flange joining structure and the various modes of the seal body used therein according to the present invention, and can be changed or modified in various ways without departing from the scope of the present invention.

INDUSTRIAL APPLICABILITY

The present invention can be applied to a flange joining structure used for connecting between fluid pipes such as a water pipe, a gas pipe, and plant piping, between such a fluid pipe and a device (such as an air valve, a fire plug, or a repair valve, for example) connected to the pipe, between these devices, or the like, and to a seal body used in the flange joining structure.

REFERENCE SIGNS LIST 2, 2A, 2B, 2C, 2D, 2E, 2F, 2G, 2H, 2K, 2L, 2M Seal body
4, 4A, 4B, 4C, 4D, 4E, 4F, 4G, 4H, 4J, 4K, 4L, 4M Annular base portion
6, 6B, 6C, 6G, 6H, 6K, 6L, 6M Elastic sealing unit
8 Through hole
16 First member
20 Second member
28 Joining bolt
32 Nut
48, 92 Communication hole
52 First ring-shaped member (first protrusion)
54 Second ring-shaped member (second protrusion)
60, 62 Gasket seat
70, 71 Washer member
74, 76 Recessed step portion
77 Short sleeve member
86 First metallic plate
88 Second metallic plate
92 Protrusion
92A First protrusion
92B Second protrusion
99 Metallic plate

The invention claimed is:

1. A seal body that is disposed between a first annular flange portion of a first member and a second annular flange portion of a second member, the seal body comprising:
an annular base portion formed of a metallic plate; and
an elastic sealing unit integrally provided to the annular base portion, wherein
a plurality of through holes through which bolts are inserted are provided on the annular base portion at an interval along a circumference direction,
the elastic sealing unit is provided to entirely cover the annular base portion,
a first protrusion that is formed of a hard material, protrudes in a direction perpendicular to a plane extension direction of the annular base portion and comes into contact with the annular base portion is provided on one surface side of the annular base portion of the seal body,
a second protrusion that is formed of a hard material, protrudes in the direction perpendicular to the plane extension direction of the annular base portion and comes into contact with the annular base portion is provided on another surface side,
the first protrusion and the second protrusion are covered with the elastic sealing unit, and
the elastic sealing unit provides sealing between the first annular flange portion of the first member and the second annular flange portion of the second member.

2. A flange joining structure comprising:
a first member including a first annular flange portion;
a second member including a second annular flange portion; and
a seal body disposed between the first annular flange portion of the first member and the second annular flange portion of the second member, wherein
a bolt is inserted through a through hole of a plurality of through holes in each of the first annular flange portion, the second annular flange portion, and the seal body,
a nut is screwed onto a male screw portion of the bolt so that the first annular flange portion and the second annular flange portion are joined to each other,
the seal body includes:
an annular base portion formed of a metallic plate; and
an elastic sealing unit integrally formed on the annular base portion,
the plurality of the through holes are provided on the annular base portion at an interval along a circumference direction,
the elastic sealing unit is provided to entirely cover the annular base portion, a first protrusion that is formed of a hard material, protrudes in a direction perpendicular to a plane extension direction of the annular base portion and comes into contact with the annular base portion is provided on one surface side of the annular base portion of the seal body,
a second protrusion that is formed of a hard material, protrudes in the direction perpendicular to the plane extension direction of the annular base portion and comes into contact with the annular base portion is provided on another surface side,
the first protrusion and the second protrusion are covered with the elastic sealing unit, and
the elastic sealing unit of the seal body provides sealing between the first annular flange portion of the first member and the second annular flange portion of the second member.

3. The flange joining structure according to claim 2, wherein
the first protrusion is provided in plural, and the plurality of first protrusions of the seal body are provided on the one surface side of the annular base portion at an interval along the circumference direction, and
the second protrusion is provided in plural, and the plurality of second protrusions of the seal body are provided on the other surface side of the annular base portion at an interval along the circumference direction.

4. The flange joining structure according to claim 3, wherein
the first protrusions are formed by partially bending the annular base portion toward the one surface side of the annular base portion, and
the second protrusions are formed by partially bending the annular base portion toward the other surface side of the annular base portion.

5. The flange joining structure according to claim 4, wherein roughening to form a rough surface and/or drilling for forming a through hole is performed on the inner circumference portion of the annular base portion of the seal body.

6. The flange joining structure according to claim 3, wherein the annular base portion is formed of first and second metallic plates, the first protrusions of the annular base portion are formed by bending a plurality of portions of the first metallic plate in the circumference direction, the second protrusions of the annular base portion are formed by bending a plurality of portions of the second metallic plate in the circumference direction, and the annular base portion is formed by stacking the first metallic plate and the second metallic plate with the first protrusions on the one surface side of the seal body and the second protrusions on the other surface side of the seal body.

7. The flange joining structure according to claim 6, wherein roughening to form a rough surface and/or drilling for forming a through hole is performed on the inner circumference portion of the annular base portion of the seal body.

8. The flange joining structure according to claim 3, wherein roughening to form a rough surface and/or drilling for forming a through hole is performed on the inner circumference portion of the annular base portion of the seal body.

9. The flange joining structure according to claim 2, wherein the first protrusion is provided in plural, and the first protrusions are formed by partially bending the annular base portion toward the one surface side of the annular base portion, and the second protrusion is provided in plural, and the second protrusions are formed by partially bending the annular base portion toward the other surface side of the annular base portion.

10. The flange joining structure according to claim 9, wherein roughening to form a rough surface and/or drilling for forming a through hole is performed on the inner circumference portion of the annular base portion of the seal body.

11. The flange joining structure according to claim 2, wherein the annular base portion is formed of first and second metallic plates, the first protrusion is provided in plural, and the first protrusions of the annular base portion are formed by bending a plurality of portions of the first metallic plate in the circumference direction, the second protrusion is provided in plural, and the second protrusions of the annular base portion are formed by bending a plurality of portions of the second metallic plate in the circumference direction, and the annular base portion is formed by stacking the first metallic plate and the second metallic plate with the first protrusions on the one surface side of the seal body and the second protrusions on the other surface side of the seal body.

12. The flange joining structure according to claim 11, wherein roughening to form a rough surface and/or drilling for forming a through hole is performed on the inner circumference portion of the annular base portion of the seal body.

13. The flange joining structure according to claim 2, wherein roughening to form a rough surface and/or drilling for forming a through hole is performed on the inner circumference portion of the annular base portion of the seal body.

* * * * *